(12) United States Patent
Amacker (10) Patent No.: US 8,224,823 B1
(45) Date of Patent: Jul. 17, 2012

(54) BROWSING HISTORY RESTORATION

(75) Inventor: Matthew Amacker, Santa Clara, CA (US)

(73) Assignee: A9.com, Inc., Palo Alto, CA (US)

( * ) Notice: Subject to any disclaimer, the term of this patent is extended or adjusted under 35 U.S.C. 154(b) by 202 days.

(21) Appl. No.: 12/827,108

(22) Filed: Jun. 30, 2010

(51) Int. Cl.
*G06F 17/30* (2006.01)

(52) U.S. Cl. ......... 707/736; 707/749; 707/751; 707/768

(58) Field of Classification Search .................. None
See application file for complete search history.

(56) References Cited

U.S. PATENT DOCUMENTS

| | | | |
|---|---|---|---|
| 8,122,020 B1 * | 2/2012 | Donsbach et al. | 707/732 |
| 2008/0289029 A1 * | 11/2008 | Kim et al. | 726/12 |
| 2009/0287658 A1 * | 11/2009 | Bennett | 707/3 |
| 2009/0287659 A1 * | 11/2009 | Bennett | 707/3 |
| 2009/0287684 A1 * | 11/2009 | Bennett | 707/5 |

* cited by examiner

*Primary Examiner* — Debbie Le
(74) *Attorney, Agent, or Firm* — Novak Druce + Quigg LLP (57) ABSTRACT

Systems and methods are presented for restoring and/or utilizing browsing history for dynamically-generated or modified content is described. In one embodiment, the method includes: in response to a user request to display a page of information including a navigational element on a computing device, obtaining a content identifier for content associated with the navigational element, identifying a stored content identifier associated with the content and corresponding to a prior navigational element that was previously viewed on the computing device, verifying the prior navigational element associated with the stored content identifier, and setting at least one property of the navigational element to indicate, when displayed, that the content associated with the navigational element was previously viewed on the computing device.

14 Claims, 9 Drawing Sheets

BROWSING HISTORY RESTORATION

BACKGROUND

Electronic entities having a presence in an electronic environment, such as may be provided via a Web site or other such source of content, take advantage of the full capabilities of modern browsers to deliver a compelling user experience. Web browsers such as Firefox® or Internet Explorer® store a list of Web pages (a.k.a. resources) browsed by a user for a period of time, and will load the current user's browse history into memory when the user opens the browser. When the browser displays a Web page including one or more pointers (e.g., hyperlinks or "links"), the browser will compare data associated with each pointer against information in the user's browse history. A specified action can be taken for any pointer that at least partially matches information in the user's browse history. For example, the browser can auto-complete a URL in the address bar or provide special styling (e.g., marking or coloring) of previously-accessed (visited) pointers ("links") on a page. Link styling, or more generally, the applying of one or more special properties to a visited resource identifier, serves to improve user experience as the user may easily compare already visited links with links that have not yet been visited.

However, in some cases, it may not be possible to use standard Web browser functionality for utilizing browse history. For example, electronic entities may modify data associated with accessed links by dynamically generating address data strings associated with the links, such as URLs, and adding one or more instance-specific parameters. Thus, it is possible that each time a user views a link to the same content in response to a different search or as part of a different session, for example, that the link will be slightly different, such that the browser cannot automatically identify that the content was viewed previously. While adding dynamic and/or proprietary parameters to a link's URL can provide the electronic entity with information necessary for further analysis of user behavior, product performance, and the like, the parameters can prevent a Web browser from recognizing the URLs such that the user has to spend additional time and effort to search the links that he or she may already have visited.

DETAILED DESCRIPTION

Systems and methods are presented for restoring and/or utilizing browsing history for dynamically-generated or modified content, such as links or pointers to Web resources having dynamically-modified address data strings (e.g., URLs) associated with them. A pointer, or link, is a reference to a Web resource (e.g., a document or file) that a user can directly follow, or that is followed automatically. A link normally points to a whole Web document or to a specific element within a document. An example of a Web document is a Web page that is suitable for the World Wide Web and can be accessed through a Web browser and displayed on a monitor of a computing device. For the purposes of simplicity, address data strings associated with pointers, or hyperlinks (links), will be hereinafter called "resource identifiers." One skilled in the art will appreciate that a navigational element, such as a pointer or hyperlink, and resource identifier associated with a link are not one and the same.

In one embodiment, Web resources (such as Web pages) visited by a user may contain information for one or more items (e.g., products or services) that the user located, such as through browsing or search. An electronic entity associated with each Web page may supply a unique identifier that is associated with each item. A unique identifier, in one example, refers to a unique identification number assigned to a product for identification purposes. The unique identifiers may be internal or specific to the electronic entity. Alternatively, unique identifiers of products may be supplied by vendors associated with the electronic entity, and may be the same for different electronic entities. A main characteristic of a unique identifier is that the identifier can be recognized by an electronic entity.

In one embodiment, techniques utilize a trusted script loaded into a Web resource, such as a Web page visited by a user. The trusted script sends unique identifiers associated with every searched item to an electronic entity. The unique identifiers associated with products viewed by a user are tracked and stored in a data store. The address data strings (resource identifiers) of pointers, such as hyperlinks to a Web page, associated with the unique identifiers are also tracked and stored before the resource identifiers are modified. The unique identifiers of products viewed in a new search session are compared with the unique identifiers stored in the data store. If any matches between the unique identifiers are found, a last-known resource identifier of the page visited by the user and the matched unique identifiers (with associated time stamps) are returned to the browser. In one embodiment, the last-known resource identifier may be inserted in a Web page (e.g., search results page) the user is visiting. In one embodiment, an insertion of the resource identifier in a Web page is done using the above-described trusted script, such as JavaScript. If the last-known resource identifier is recognized by the browser, the links to products associated with the matched unique identifiers may be styled, or marked as already viewed or "visited," such that the links may be distinguished from other links presented to the user, for example, in a form of search results on the Web page.

Figure 1:
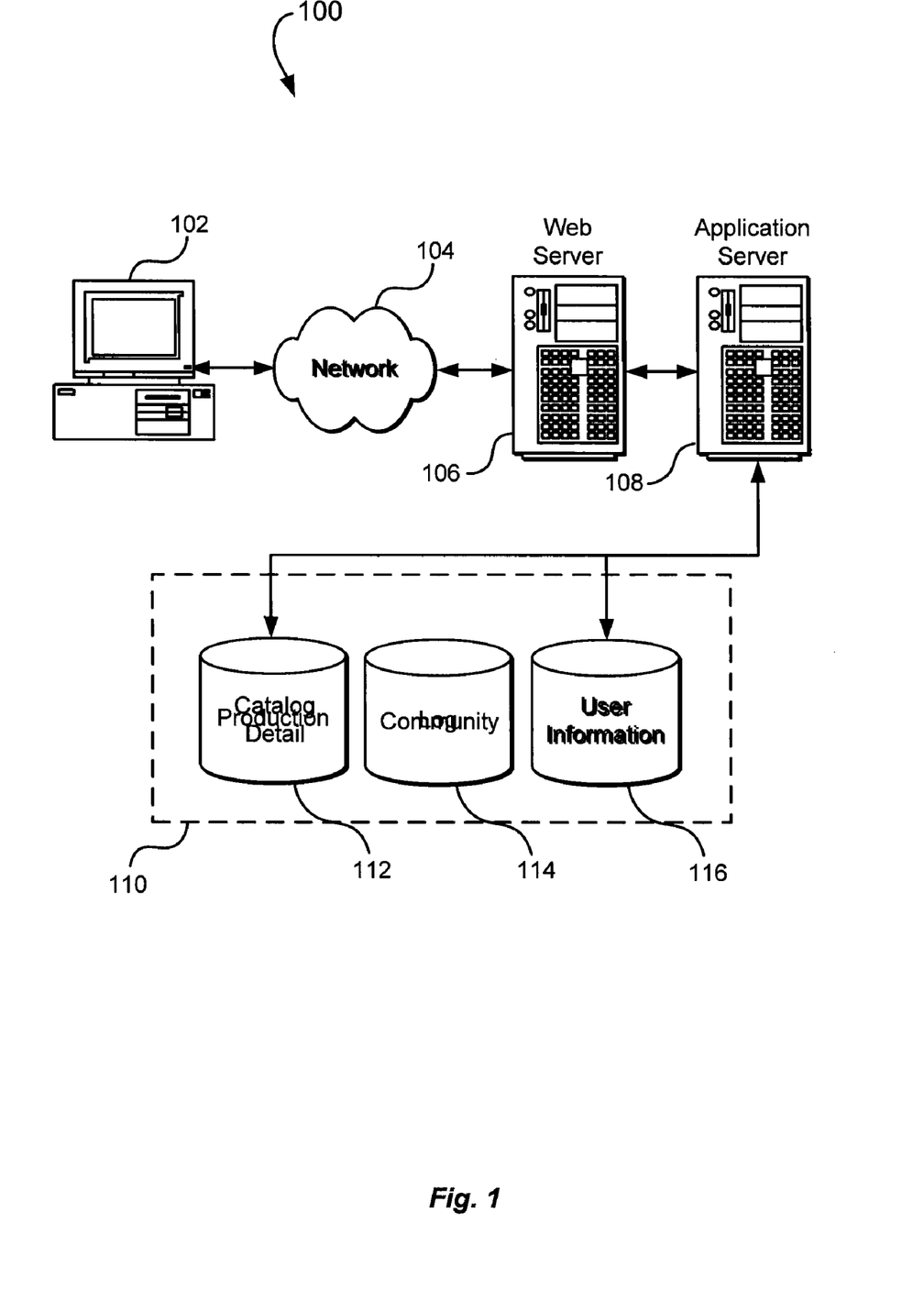
FIG. 1 illustrates an environment in which various embodiments can be implemented.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, and the environment includes a Web server 106 for receiving requests and serving content in response thereto, although for other networks, an alternative device serving a similar purpose could be used, as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein, the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to a viewer, which may be served to the viewer by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing log data 114, which can be used for reporting, generating statistics, and other such purposes. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a viewer might submit a search request for a certain type of item. In this case, the data store might access the user information to verify the identity of the viewer, and can access the catalog detail information to obtain information about items of that type. The information then can be returned to the viewer, such as in a results listing on a Web page that the viewer is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
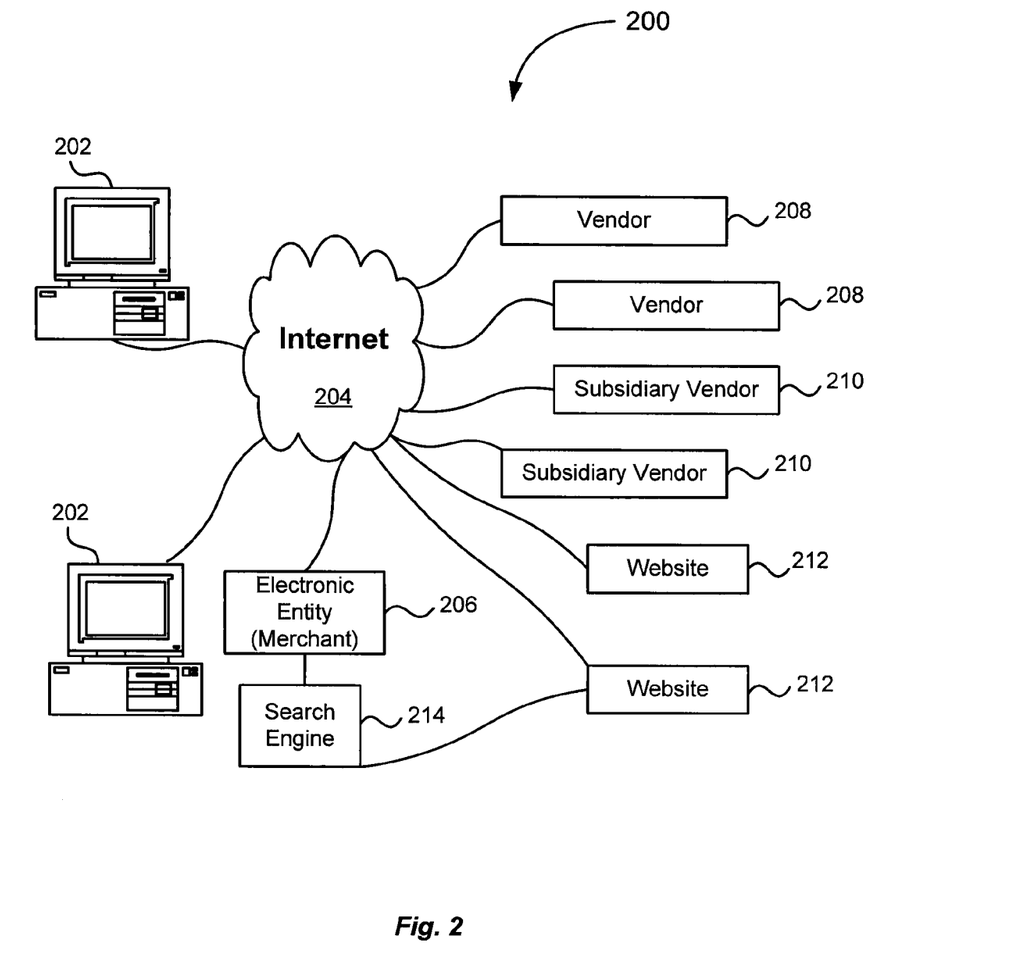
FIG. 2 illustrates an environment in which various embodiments may be practiced.

FIG. 2 shows an example environment 200 in which various embodiments may be practiced. The environment 200 may be realized utilizing one or more of the components of the environment described above in connection with FIG. 1. The environment 200, in an embodiment, includes a plurality of users operating client computing devices 202 that utilize a network such as the Internet 204 to browse content of various content providers. While the environment 200 shows the client computing devices 202 utilizing the Internet, it should be understood that other networks may be used as an alternative to or in addition to the Internet 204. Examples of other networks include mobile networks, intranets, and generally any suitable communications network. Likewise, it should be understood that client computing devices 202 may include personal computers, cell phones, handheld messaging devices, laptop computers, set-top boxes, personal data assistants, electronic book readers, and the like.

In an embodiment, users may interact through devices 202 with other entities in order to consume content, search for information, purchase items for consumption, and the like. As used herein, an item for consumption includes any product or item which may be consumed by a consumer. Examples include tangible items, such as consumer products. Examples also include electronic items which may be downloaded and/or streamed, including audio files, video files, and other digital content. Examples of items for consumption also include services which may be performed for and/or on behalf of consumers. As shown in FIG. 2, the environment 200 includes an electronic entity, or merchant 206. The merchant 206, for example, may operate an electronic marketplace such that the users may submit via devices 202 orders for items for consumption offered by the merchant 206. The merchant 206 may offer consumer products that it sells itself and may fulfill orders for the items itself, such as from its own distribution warehouse. The merchant may also offer for consumption items while another entity may fulfill orders for the items for consumption. The merchant 206 may also operate systems, such as those described above in connection with FIG. 1, that enable others to utilize the systems to offer items for consumption. In short, the merchant 206 may facilitate user search and consumption of items or products offered by the merchant 206 or vendors 208 and/or 210.

For example, in an embodiment, the environment 200 includes one or more affiliate or third party vendors 208. In an embodiment, an affiliate vendor is a merchant who offers for consumption items that are actually consumed by consumers from the merchant 206. For example, a consumer may place an order with an affiliate vendor 208 and the primary merchant 206 may fulfill the order by providing or causing to be provided any items for consumption ordered. Affiliate vendors 208 may cooperate with the merchant 206 in various ways. In one embodiment, the merchant 206 may operate an electronic marketplace, such as a Web site 212 and advertise and/or sell items for consumption that are offered by the affiliate vendor 208. Affiliate vendors 208 may utilize various systems provided by the merchant 206, such as electronic checkout systems that enable users to pay for items for consumption, and other systems.

The environment 200 may include one or more subsidiary vendors 210. In an embodiment, a subsidiary vendor is a merchant whose operations may be controlled, either completely or partially, by the merchant 206. For example, a subsidiary vendor 210 may be operated by the merchant 206, but may offer items for consumption under a different brand than the merchant 206. The subsidiary vendor 210 may offer the same or different products for consumption than the merchant 206. Alternatively, the subsidiary vendor 210 may be operated by the affiliate vendor 208, but may offer items for consumption under a different brand than the affiliate vendor 208, which may be advertised and/or offered for sale by the affiliate vendor 208 on the merchant 206's Web site 212.

In an embodiment, the environment 200 includes components and instructions for generating one or more Web sites 212. One or more of the Web sites 212 may be operated by the merchant 206, although they need not be. The Web sites 212 may offer various types of content, such as news, video, shopping for products, and the like. The Web sites 212 may offer other services, such as content or product search services, audio, social networking services, and the like. While the example environment 200 shows Web sites for the purpose of illustration, it should be understood that any type of content provider may be included in the environment 200 or variations thereof. For example, content may be provided in various ways, such as through an application interface or through other mechanisms that may not be properly classified as Web sites.

As noted, in an embodiment, the users may interact with content from the various entities, such as by searching products offered by the entities, viewing content from the entities, consuming items from the entities, and the like. In order to search for products or other content provided by the entities, the users may utilize a Web search engine 214. As one skilled in the art will appreciate, a Web search engine may be a software or a combination of software and hardware designed to search for information on the Internet. The search engine may be rendered to a client device 202 via a particular Web site or Web sites, such as the Web sites 212. The Web search engine 214 may be affiliated with the merchant 206 in a number of different ways, such as, for example, it may be designed and/or owned by the merchant 206, operated by the merchant 206, contracted by the merchant 206, be independent or autonomous from the merchant 206, and the like.

Figure 3:
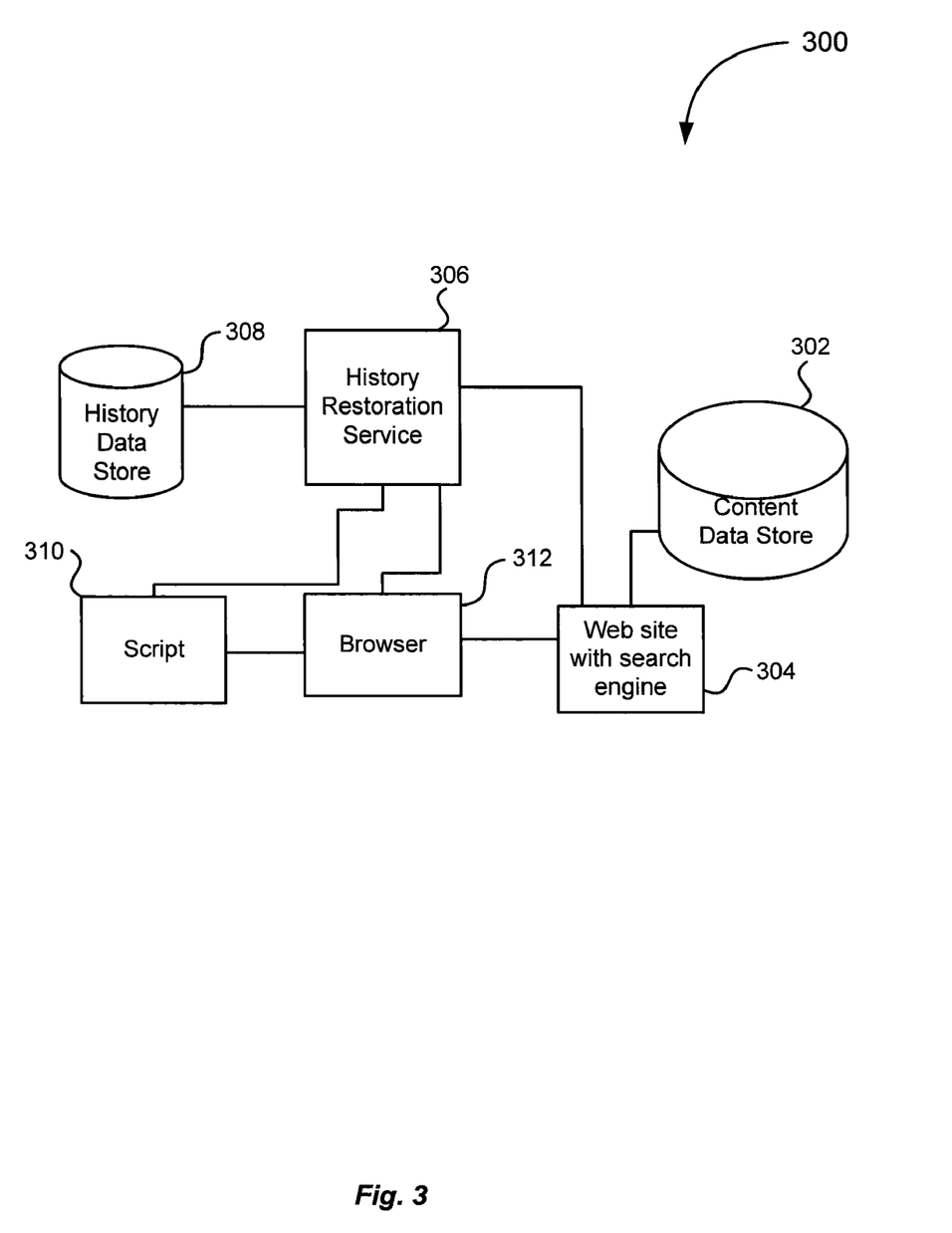
FIG. 3 illustrates a diagrammatic representation of an environment which may incorporate one or more components that are described above in connection with FIG. 1 and that may be used in accordance with various embodiments.

FIG. 3 shows an illustrative environment 300 that an electronic entity such as the merchant 206 may utilize in order to provide a user with an ability to repeatedly search for product items or other content offered by the merchant 206 and/or vendors 208 and 210 such that the user can keep track of already-viewed products or content. The environment 300 may be implemented to increase search efficiency for the users utilizing one or more client devices 202 and thus increase effectiveness for one or more of the entities 206, 208, and/or 210 shown in FIG. 2. In an embodiment, the environment 300 of FIG. 3 is utilized by an electronic entity (such as the merchant 206) to provide a browsing history to a user using a browsing history restoration service described herein. It is to be understood that the history restoration service may comprise a number of various implementations, including but not limited to, a software application component executed on a computing device, such as one or more Web servers. In one embodiment, the service may be offered as a part of remote computing services that together make up a cloud computing platform, offered over the Internet. The service may be configured to run in a Web server environment, such as a pure Java HTTP Web server environment.

In an embodiment, the environment 300 includes a content data store 302 that provides content to users and with which users may interact. For example, content may include products or items of various types that are to be placed on the merchant's Web site 304. The content stored in the content data store 302 may be utilized by merchants, Web sites, or other entities in order to provide users an opportunity to consume items and/or other content. In an embodiment, the content data store 302 stores content to be provided to users, such as when users request the content by navigating to a Web site 304 operated by the merchant. The Web site may utilize a search engine as described above in order to provide a user with the ability to search for products offered by the merchant 206 or other entities.

Figure 9:
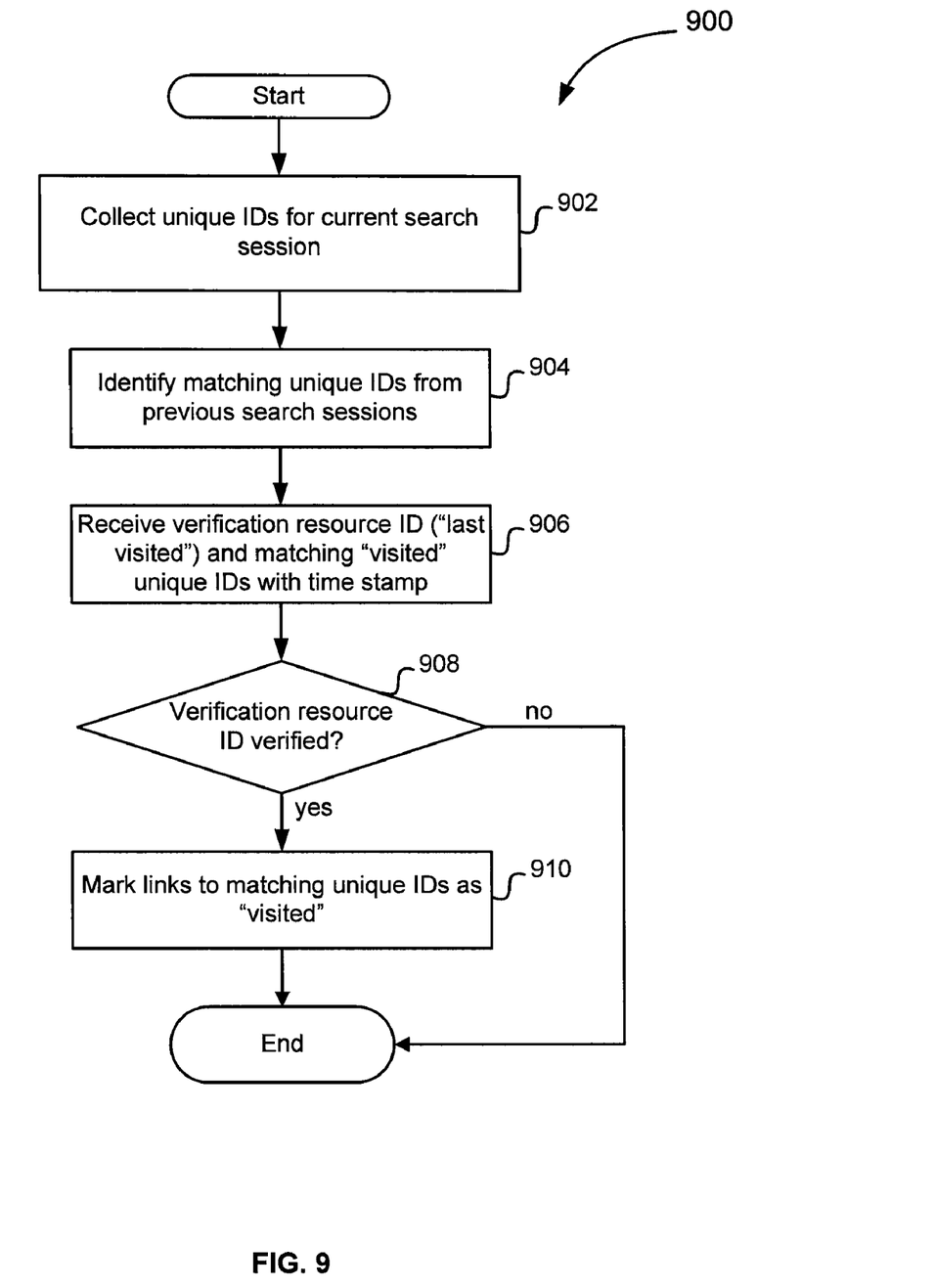
FIG. 9 illustrates a process flow diagram for operation of the search history restoration service in accordance with another embodiment.

In an embodiment, a history restoration service 306 provides a user with the ability to keep track of viewed products while searching products provided by the content data store 302, as will be described later at greater detail. As described in more detail below, generally, the history restoration service 306, in an embodiment, utilizes information such as unique identifiers of the products previously visited (viewed) by a user on the Web site 304, as well as historical data stored in a history data store 308 in order to mark previously visited products using a trusted script 310 operating on the Web site 304 that is loaded by a browser 312. The data store 308 may be implemented in a number of different ways. For example, in an embodiment, the data store 308 may comprise a dedicated database accessible by the service 306. In some Web environments, such as, for example, one provided by the HyperText Markup Language (HTML) 5, the data store 308 may be allocated within a Web site or within a domain. For example, the data store 308 may be embedded in the pages of the Web site 304 and may be shared with any page visited by the user on that Web site. Thus, the trusted script 310 may communicate with the data store 308 within the browser 312 that displays the Web site 304 to a user. The trusted script 310 may be loaded on a page of the Web site 304 when a user accesses the Web site. In another embodiment, the trusted script may be implemented and is an extension (i.e., a plug-in application) to the browser and may be configured to recognize product unique identifiers associated with the merchant. In this embodiment, the trusted script 310 does not have to be Web site-specific; the script may be provided as a part of a browser or be installed as an extension to a browser. An implementation of an embodiment involving a data store within a Web site or domain will be described below with reference to FIG. 9.

In operation, the history restoration service 306 receives the product unique identifiers from the trusted script 310 and stores the identifiers in the history data store 308. When the unique identifiers from a new user search are received, the history restoration service 306 compares the identifiers with the ones stored in the history data store 308. If matching identifiers are found, the history restoration service 306 sends the matching identifiers with associated "visited time" data back to the trusted script 310 along with the last visited link's address (e.g., a "verification resource identifier") to a product that was also stored in the history data store 308. The trusted script 310 checks with the browser 312 to determine whether the browser would recognize the verification resource identifier. If the verification resource identifier is verified by the browser 312 as already visited by the user, the trusted script may mark all links pointing to the matching unique identifiers as "visited."

Figure 4:
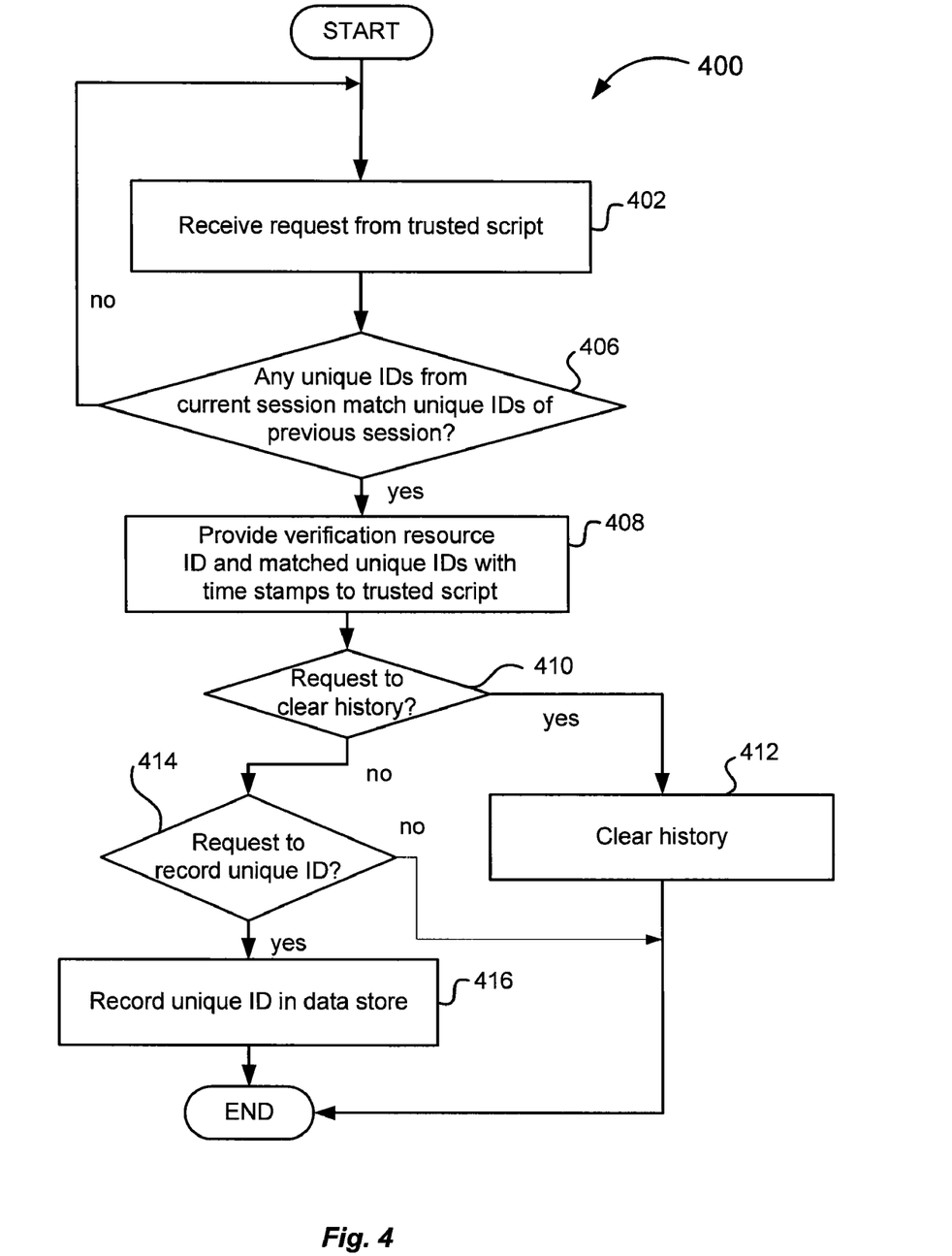
FIG. 4 illustrates a process flow diagram for operation of the search history restoration service in accordance with an embodiment.

The operation of the history restoration service 306 will now be described in greater detail with reference to FIG. 4. The process of the service operation 400 begins at block 402, where a request is received from a trusted script associated with a Web site or a browser as described above in reference to FIG. 3. In one embodiment, the request may comprise a GET request known to those skilled in the art. The request may include unique identifiers of visited products and associated resource identifiers. At decision block 406, it is determined whether any unique identifiers associated with the current session match any unique identifiers associated with the previous session. The unique identifiers associated with the previous session are stored in the history data store described above in reference to FIG. 3. If no matching identifiers are found, the process returns and waits till the next product search session occurs. If matching identifiers are found, at block 408 a last visited link's address ("verification resource identifier") and the matched unique identifiers from the previous session are provided to the trusted script. The matched unique identifiers may be provided with the time stamp indicating the time when a user visited the items associated with the matched unique identifiers in the previous session(s). At decision block 410, it is determined whether a request to clear history (i.e., unique identifiers with associated links from the previous session) in the history data store has been received from the trusted script. As will be described below in greater detail, such request may follow when the verification resource identifier submitted by the history restoration service to the browser was not recognized by the browser. If such request has been received, at block 412, the history is cleared in the data store. If the request to clear history has not been received, at decision block 414, it is determined whether the trusted script sent any requests to record unique identifiers for products viewed by the user in a new session. If such request has been received, at block 416, the unique identifiers associated with the request are stored in the history data store.

Figure 5:
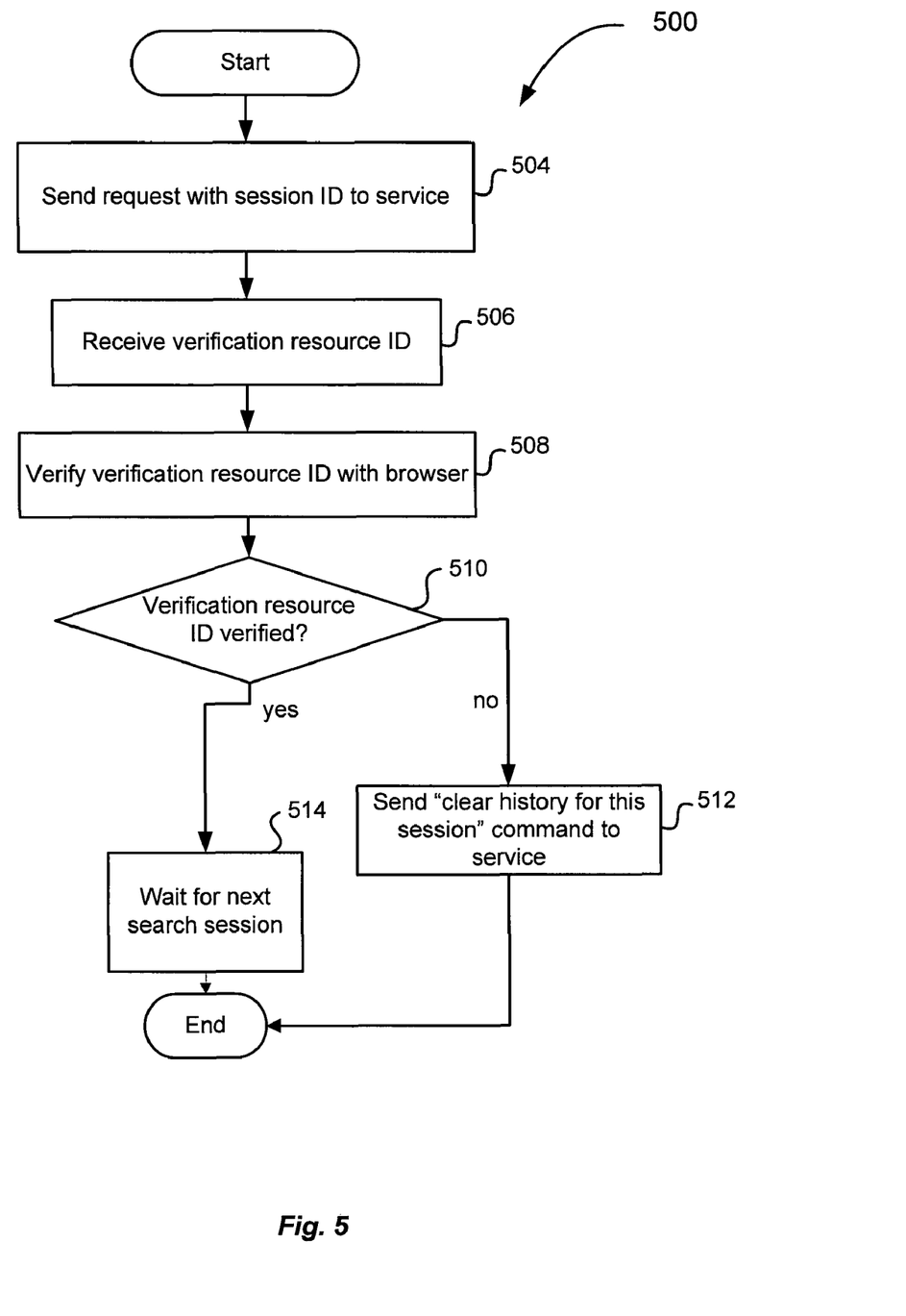
FIG. 5 illustrates a process flow diagram for the trusted script communication with the history restoration service in accordance with an embodiment.

The operation of the trusted script, such as JavaScript executed on a Web site associated with the merchant, will now be described in reference to FIGS. 5, 6, and 7. FIG. 5 illustrates a process executed by the script when a user operating a client computing device accesses an information resource, such as a Web site associated with the merchant. The trusted script is then loaded into the Web page and, at block 504, the trusted script sends a request to the history restoration service. The request may normally contain product unique identifiers visited by the user and links associated with the unique identifiers. However, if the user has not yet visited any products, the request may only contain a current session identification information (e.g., a resource identifier) that would help the history restoration service determine whether there is any history stored in the data store that is associated with the user (client device). At block 506, the service returns a "verification resource identifier" indicating the last visited link by the user in previous sessions. In one embodiment, the verification resource identifier may be used by the trusted script to create an anchor tag containing a link that the user last visited according to the service, as will be described below in reference to FIG. 7. The anchor tag may be hidden in the Web page by the trusted script. Once the anchor tag is hidden in the page, the browser may automatically mark the tag as visited or not visited. At block 508, the verification resource identifier is verified with the browser. In one embodiment, the trusted script may determine whether the tag was marked as visited. At decision block 510, it is determined whether the verification resource identifier is verified, i.e., whether the browser recognized the resource identifier as visited by the user previously. If the resource identifier has not been verified, at block 512, the trusted script sends a request to clear history to the history restoration service. In one embodiment, the "clear history" request may be implemented as a DELETE command known in the art. If the resource identifier has been verified, at block 514, the trusted script waits for next product search session.

Figure 6:
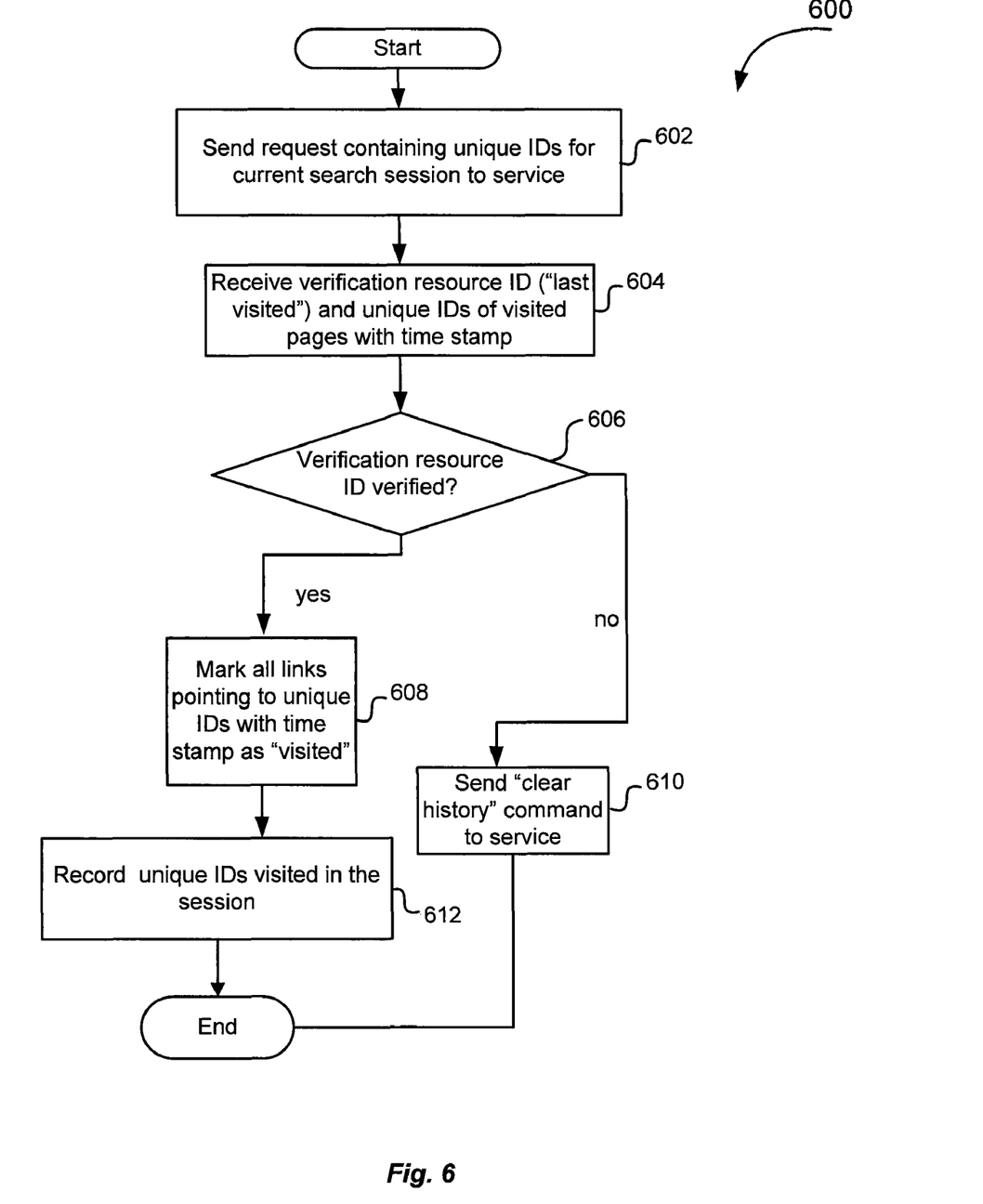
FIG. 6 illustrates a process flow diagram for the trusted script communication with the history restoration service in accordance with another embodiment.

FIG. 6 illustrates a process 600 executed by the script when a user operating a client computing device accesses the Web site associated with the merchant and has viewed at least one product or item on the Web site's Web page in a current viewing session. At block 602, the trusted script sends a request to the history restoration service. As described above, the request may contain product unique identifiers visited by the user in a search session and resource identifiers associated with the unique identifiers. At block 604, the service returns a verification resource identifier and unique identifiers of products visited in the previous session along with the time stamp. At decision block 606, it is determined whether the browser recognized the resource identifier as visited by the user previously. If the verification resource identifier is recognized by the browser, at block 608, the trusted script marks as "visited" all links associated with unique identifiers with time stamps received from the service. In one embodiment, the trusted script may also send a request to record all "visited" product unique identifiers in the history data store (block 612). The request may be implemented, for example, as a request to upload a representation of the specified resource, such as a "PUT" command known to those skilled in the art. If the browser does not recognize the verification resource identifier, at block 610, the trusted script sends the "clear history" request to the service as described above in reference to FIG. 5.

Figure 7:
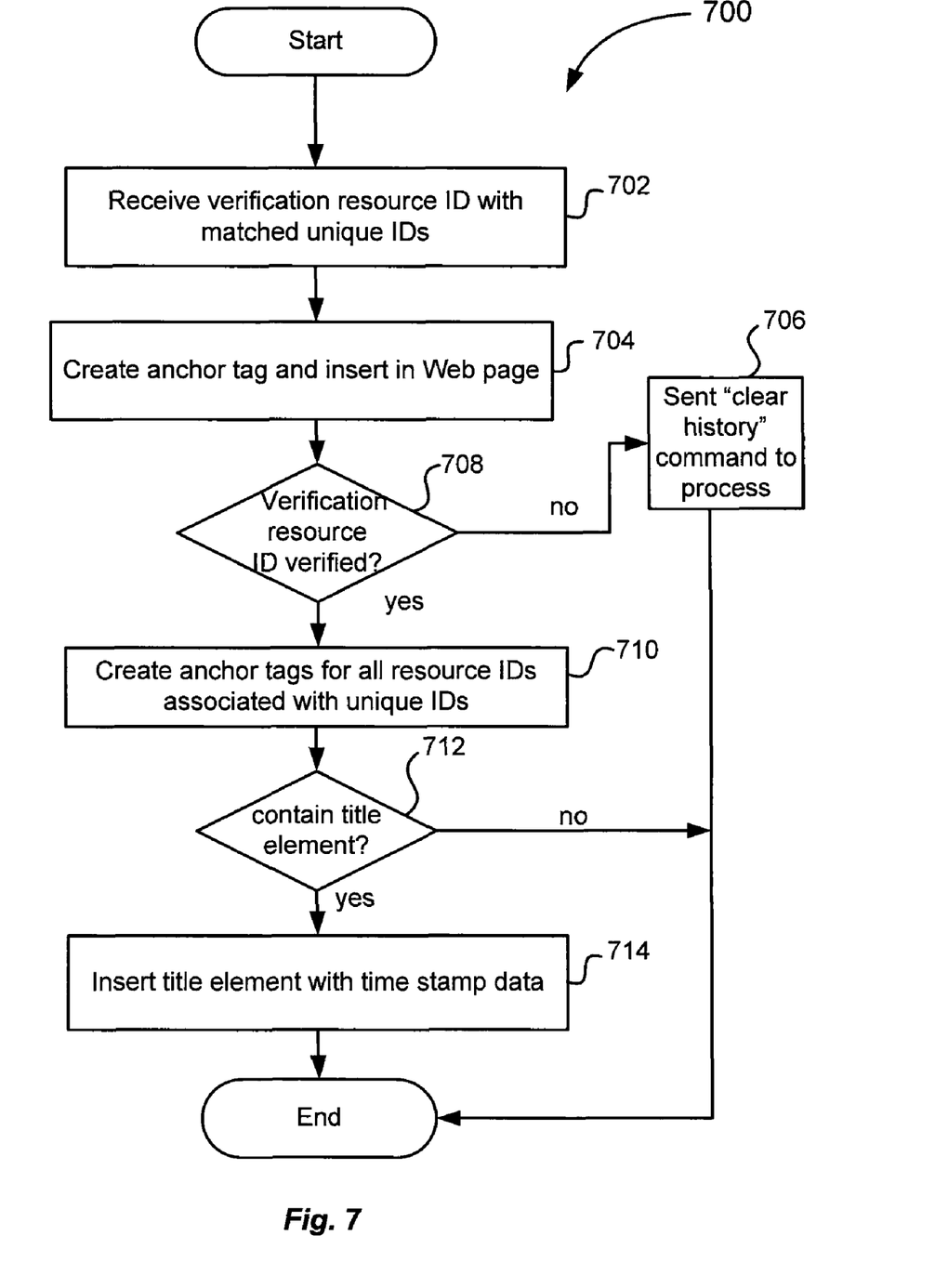
FIG. 7 illustrates a process flow diagram for the trusted script operation in accordance with another embodiment.

FIG. 7 illustrates a process 700 executed by the script in greater detail. At block 702, the trusted script receives from the service a verification resource identifier and unique identifiers of products visited in the previous session along with the time stamp in response to a request described in reference to FIGS. 5 and 6. At block 704, the trusted script creates a navigational element, e.g., an anchor tag, that includes the verification resource identifier data. As those skilled in the art will appreciate, an anchor element is a data string used to "anchor" a resource identifier to a particular text on a Web page. The anchor tag is then inserted to a Web page such that it remains invisible to a user. At decision block 708, it is determined whether the browser recognized the verification resource identifier inserted in the tag as visited by the user previously. If the verification resource identifier is not recognized by the browser, the trusted script sends a request to "clear history" to the service at block 706. If the verification resource identifier is recognized, at block 708, the trusted script creates anchor tags for all resource IDs associated with "visited" unique IDs received from the service at block 702. At decision block 712, a determination is made as to whether anchor elements contain a title value. As one skilled in the art will appreciate, a title value may be set in an anchor element to give brief information about a link associated with the tag. If anchor elements that do not have a title value associated with them are found, at block 714, the trusted script may insert title values or attributes containing information regarding a visited link into the identified anchor elements. The information may include, for example, the timing indicator (indicating the time the link was previously viewed), the "wishlisted" indicator (indicating that an item associated with the link was "wishlisted" at a certain time), or the "purchased" indicator (indicating that an item associated with the link was purchased at a certain time). The timing information may be derived from the time stamps associated with the product unique identifiers received from the service. It is known to one skilled in the art that when a cursor is moved over, or "hovered" over a link containing the title, the title value will normally be displayed to a user.

Figure 8:
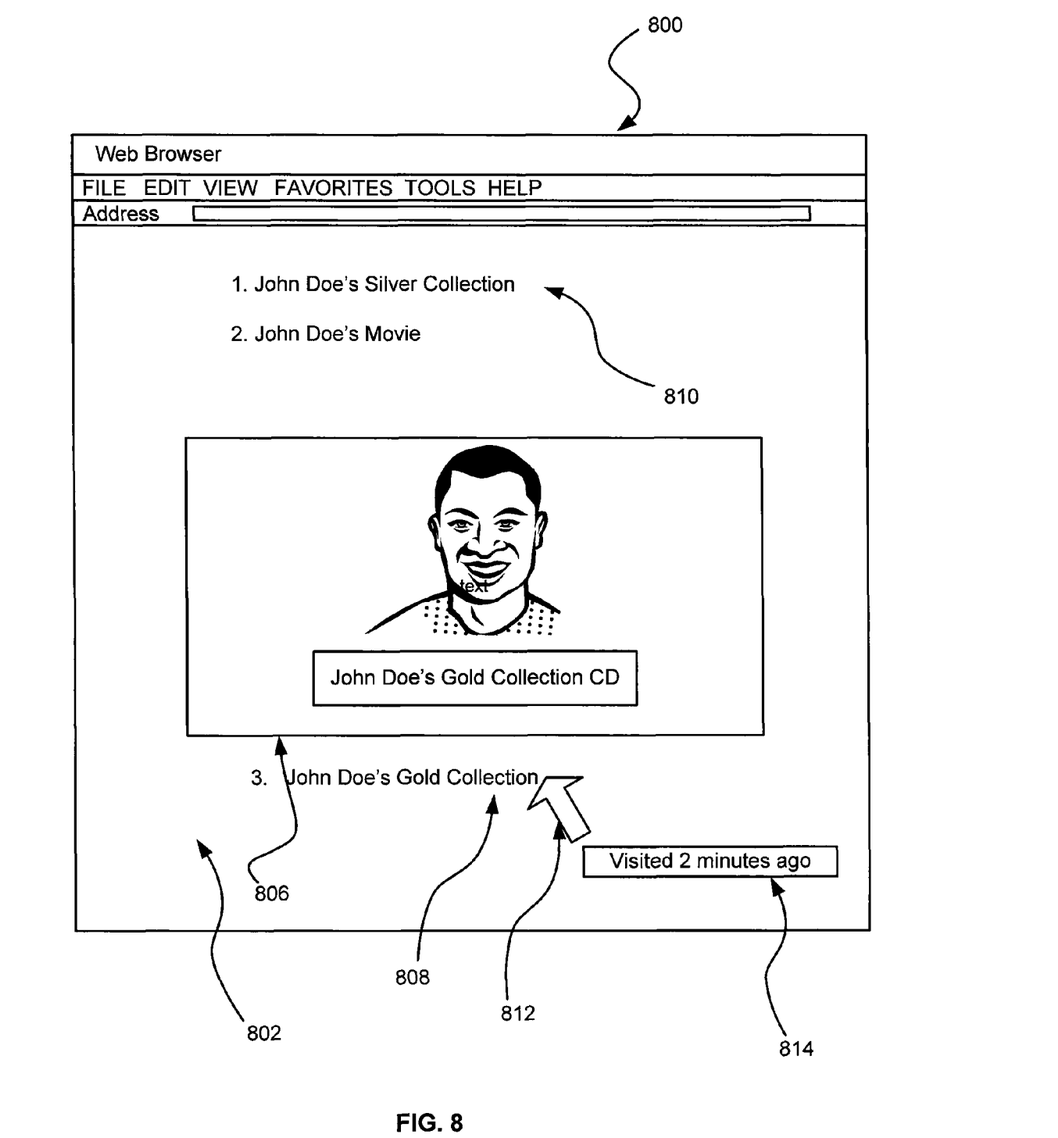
FIG. 8 illustrates an exemplary Web page showing search results marked as "visited" in accordance with an embodiment.

FIG. 8 illustrates the effect of putting timing information in a title of an anchor element on a Web site. An illustrative user interface 800 includes a browser 802. The browser displays to a user a product item 806, such as "John Doe's Gold Collection CD." Underneath the product, there is a link 808 "John Doe's Collection." Assume a user visited the page associated with the product "John Doe's Gold Collection CD" two minutes ago. As discussed above, the unique identifier associated with the product and the time stamp will be sent back to the trusted script when the user resumes his or her search on the Web site. When a user searches again for John Doe's songs, the link 808 pointing to the product visited earlier will be displayed to the user along with other search results 810. In an embodiment, the link 808 will be visibly styled, or marked so as to distinguish the link 808 from other search results 810 that have not been previously visited by the user. The methods of marking will be discussed below in greater detail. When the user "hovers" a cursor 812 over the resource identifier 808, the value of the title, e.g., timing information 814 "Visited 2 minutes ago" included in the anchor tag will be displayed to a user. In another embodiment, a similar effect may be accomplished by utilizing a trusted script, such as JavaScript® inserted into a Web page and configured to render a title value to a user when the user "hovers" the cursor over a link.

Various ways of styling or marking "visited" links will now be described. As discussed above, the trusted script may mark "visited" links so as to make them distinguishable from other search results displayed to a user accessing a merchant's Web site. Ways of "coloring" links on a Web page are known to those skilled in the art. In one embodiment, the trusted script may mark "visited" links just as a browser would, for example, in the purple color versus the blue color for "not yet visited" links. In another embodiment, the links may be marked in different colors depending on the status of the link. For example, in addition to, or instead of, a "visited" color, special and different colors or color shades may be used for marking links pointing to already purchased products, visited products whose characteristics slightly changed since the visit, similar products, and the like. In addition, different colors or color shades may be used to mark links in relation to the time of the visit. For example, more recently visited links may be marked in a darker shade of purple than the identifiers visited long ago. In another example, different colors or color shades may be used to mark more frequently visited links versus less frequently visited links.

Furthermore, the marking may indicate a degree of relevancy of a product to a user. For example, using a historic data of products visited by the user, the links pointing to products similar to one searched by a user may be marked differently. For example, if a user searched for an LCD TV, previous search results relating to a TV with similar characteristics or, in another example, search results visited more than once by a user may be prominently marked and/or prominently displayed to the user. Also, previously visited links visited by the user more frequently may be brought at the top of a search results. Such configuration of search results may help user get to not yet visited search results faster. The "visited" search results (e.g., links) may also be displayed in a number of different ways, for example, in a "drop-down menu." Furthermore, previously visited search results may be sorted, or filtered, in a number of different ways, depending on sorting factors, such as "best match," relevancy, product price, and the like.

Also, a font size of the already visited links may also vary depending on particular characteristics associated with the visited products or timings of visits. For example, larger size font may be used for links visited more recently. It is important to note that a user may be provided with the ability to set the marking colors and criteria of marking (frequency of visits, timing, relevancy, and the like) on demand. In summary, all above-mentioned variations aim at making search results more "customer-centric," i.e., tailored to each individual user. As discussed above, customer-related history needed for the above implementations may be stored in the history data store along with visited product unique identifiers and links.

As described above in reference to FIG. 3, in some embodiments, a history data store may be implemented in a Web site or a domain. In this instance, a back-end-supported history restoration service described above with reference to FIGS. 4-7 may not be needed and the history restoration service may be implemented entirely in the browser. An example of such implementation will now be described in reference to FIG. 9. The process 900 begins at block 902, where a trusted script associated with a Web site visited by a user collects product unique identifiers visited in a current search session. At block 904, the trusted script determines whether any product unique identifiers from previous search sessions stored in the data store match any of the collected product unique identifiers. If at least one match is found, at block 906, the trusted script receives a verification resource identifier and the matched product unique identifiers along with associated time stamps. At decision block 908, it is determined whether the browser recognized the resource identifier as visited by the user previously. If the verification resource identifier is recognized by the browser, at block 910, the trusted script marks as "visited" all links associated with unique identifiers with time stamps received from the service.

As discussed above, the various embodiments can be implemented in a wide variety of operating environments, which in some cases can include one or more client computers, computing devices, or processing devices which can be used to operate any of a number of applications. Client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response to requests from client devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation, those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, and the like.

Such devices also can include a computer-readable storage media reader, a communications device (e.g., a modem, a network card (wireless or wired), an infrared communication device), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the present disclosure as set forth in the claims.

What is claimed is:

1. A computer-implemented method for identifying previously-visited items in a search session, comprising:
under the control of one or more computer systems configured with executable instructions,
in response to a user request to display information related to a search for an item on a client computing device during a current search session, obtaining at least one item identifier associated with the item using a trusted script executing on the client computing device;
determining whether the obtained item identifier matches any stored item identifier for a previous search session associated with the user;
if the obtained item identifier matches a stored item identifier, providing the matched item identifier, time data associated with the matched item identifier, and a last visited resource identifier for the matched item to the trusted script;
verifying the last visited resource identifier using the trusted script; and
if the last visited resource identifier is verified, setting at least one property of a link to an item associated with the matched item identifier to indicate, when displayed, that the link is associated with a previously viewed item,
wherein a link to a previously-viewed item is distinguished from other links displayed on the client computing device independent of whether a current resource identifier for the item is the same as the last visited resource identifier.

2. The computer-implemented method of claim 1, wherein verifying the last visited resource identifier with the browser comprises determining whether the last visited resource identifier matches any of resource identifiers from a previous search session stored by the browser.

3. The computer-implemented method of claim 1, further comprising:
in response to a request to delete stored item identifiers associated with previous search sessions, deleting the stored item identifiers.

4. A computer-implemented method for identifying previously-visited items, the method comprising:
under control of instructions executed by at least one processor of a computer system,
collecting one or more item identifiers associated with one or more items currently viewed by a user on a Web site;
determining whether one or more of the collected one or more item identifiers is associated with items previously viewed by the user on the Web site;
if one or more of the collected one or more item identifiers is associated with one or more previously viewed items, verifying with a browser rendering the Web site to the user a resource identifier associated with a last viewed of the one or more previously viewed items; and
if the resource identifier associated with a last viewed of the one or more previously viewed items is verified, marking each of the links to items associated with the one or more previously viewed items so as to distinguish the marked links from links associated with currently viewed items that were not previously viewed; and
inserting in each of the marked links at least one title attribute associated with the one or more previously viewed items so that the at least one title attribute becomes visible when the link is accessed by the user.

5. The computer-implemented method of claim 4, wherein marking each of links comprises one of coloring the links in a color that is different from a color of the links associated with currently viewed items that were not previously viewed, displaying the links above the links associated with currently viewed items that were not previously viewed, or rendering the links in a font size that is different from a font size used for the links associated with currently viewed items that were not previously viewed.

6. The computer-implemented method of claim 4, wherein the at least one title attribute comprises timing information indicating a time of viewing a previously viewed item.

7. The computer-implemented method of claim 4, wherein the item identifiers associated with the currently viewed items that were not previously viewed are recorded in a database associated with the Web site.

8. A system for identifying previously-visited items in a search session, comprising:
at least one device processor; and
device memory including instructions that, when executed by the at least one device processor, cause the system to:
in response to a user request to display information related to a search for an item on a client computing device during a current search session, obtain at least one item identifier associated with the item using a trusted script executing on the client computing device;
determine whether the obtained item identifier matches any stored item identifier for a previous search session associated with the user;
if the obtained item identifier matches a stored item identifier, provide the matched item identifier, time data associated with the matched item identifier, and a last visited resource identifier for the matched item to the trusted script;
verify the last visited resource identifier using the trusted script; and
if the last visited resource identifier is verified, set at least one property of a link to an item associated with the matched item identifier to indicate, when displayed, that the link is associated with a previously viewed item,
wherein a link to a previously-viewed item is distinguished from other links displayed on the client computing device independent of whether a current resource identifier for the item is the same as the last visited resource identifier.

9. The system of claim 8, wherein verifying the last visited resource identifier with the browser comprises determining whether the last visited resource identifier matches any of resource identifiers from a previous search session stored by the browser.

10. The system of claim 8, further comprising:
in response to a request to delete stored item identifiers associated with previous search sessions, delete the stored item identifiers.

11. A non-transitory computer-readable storage medium including instructions for identifying previously-visited items, the instructions when executed by at least one processor of a computing system causing the computing system to:
collect one or more item identifiers associated with one or more items currently viewed by a user on a Web site;
determining whether one or more of the collected one or more item identifiers is associated with items previously viewed by the user on the Web site;
if one or more of the collected one or more item identifiers is associated with one or more previously viewed items, verifying with a browser rendering the Web site to the user a resource identifier associated with a last viewed of the one or more previously viewed items; and
if the resource identifier associated with a last viewed of the one or more previously viewed items is verified,
mark each of the links to items associated with the one or more previously viewed items so as to distinguish the marked links from links associated with currently viewed items that were not previously viewed; and
insert in each of the marked links at least one title attribute associated with the one or more previously viewed items so that the at least one title attribute becomes visible when the link is accessed by the user.

12. The non-transitory computer-readable storage medium of claim 11, wherein marking each of links comprises one of coloring the links in a color that is different from a color of the links associated with currently viewed items that were not previously viewed, displaying the links above the links associated with currently viewed items that were not previously viewed, or rendering the links in a font size that is different from a font size used for the links associated with currently viewed items that were not previously viewed.

13. The non-transitory computer-readable storage medium of claim 11, wherein the at least one title attribute comprises timing information indicating a time of viewing a previously viewed item.

14. The non-transitory computer-readable storage medium of claim 11, wherein the item identifiers associated with the currently viewed items that were not previously viewed are recorded in a database associated with the Web site.

* * * * *